(No Model.) 3 Sheets—Sheet 1.

J. B. HADAWAY.
STITCH SEPARATING AND INDENTING MACHINE.

No. 548,309. Patented Oct. 22, 1895.

Witnesses:
Walter E. Lombard.
Theodore Fletcher

Inventor:
John B. Hadaway,
by N. C. Lombard
Attorney.

(No Model.) 3 Sheets—Sheet 3.

J. B. HADAWAY.
STITCH SEPARATING AND INDENTING MACHINE.

No. 548,309. Patented Oct. 22, 1895.

Witnesses:
Walter E. Lombard.
H. Theodore Fletcher.

Inventor:
John B. Hadaway,
by N. C. Lombard
Attorney.

UNITED STATES PATENT OFFICE.

JOHN B. HADAWAY, OF BROCKTON, MASSACHUSETTS.

STITCH-SEPARATING AND INDENTING MACHINE.

SPECIFICATION forming part of Letters Patent No. 548,309, dated October 22, 1895.

Application filed June 4, 1895. Serial No. 551,612. (No model.)

*To all whom it may concern:*

Be it known that I, JOHN B. HADAWAY, of Brockton, in the county of Plymouth and State of Massachusetts, have invented certain new and useful Improvements in Stitch-Separating and Indenting Machines, of which the following, taken in connection with the accompanying drawings, is a specification.

My invention relates to stitch-separating and indenting machines; and it consists in certain novel features of construction, arrangement, and combination of parts which will be readily understood by reference to the description of the accompanying drawings, and to the claims hereto appended, and in which my invention is clearly pointed out.

Figure 1:
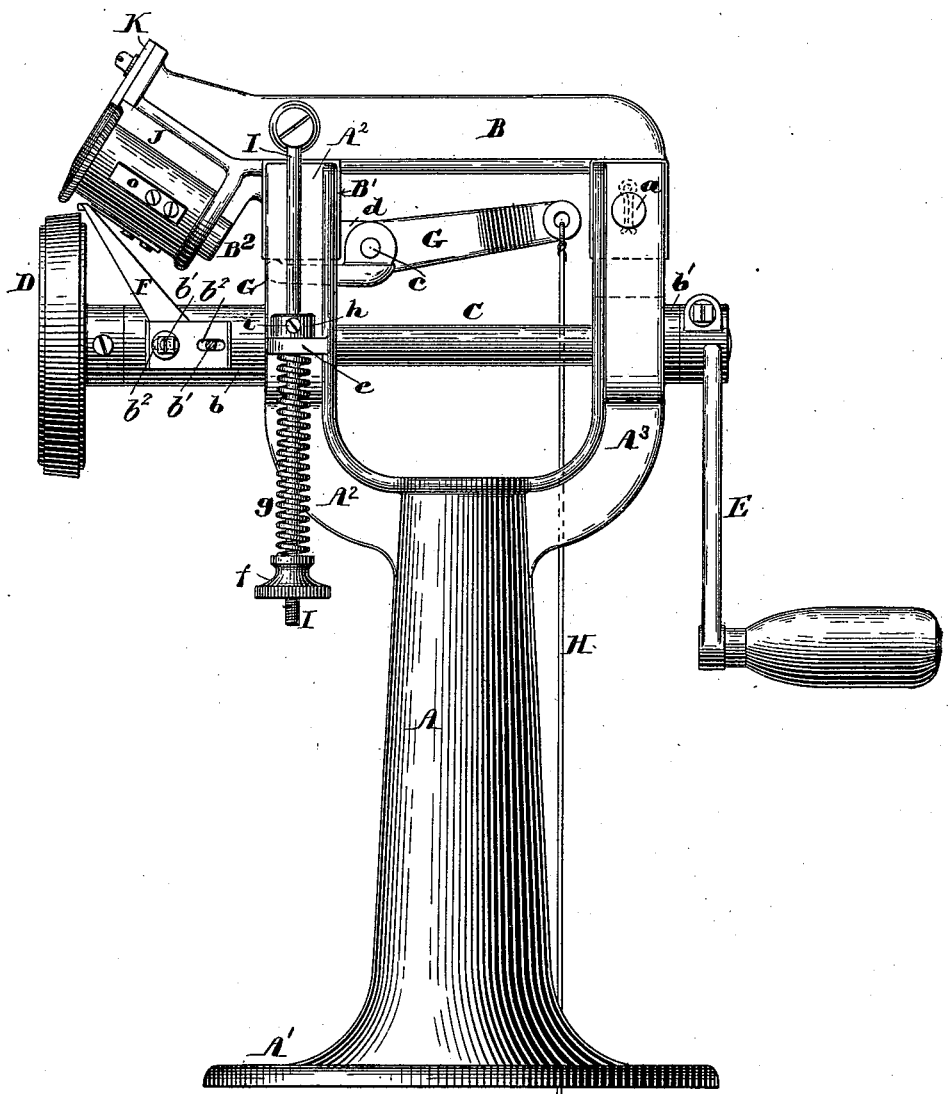
Figure 2:
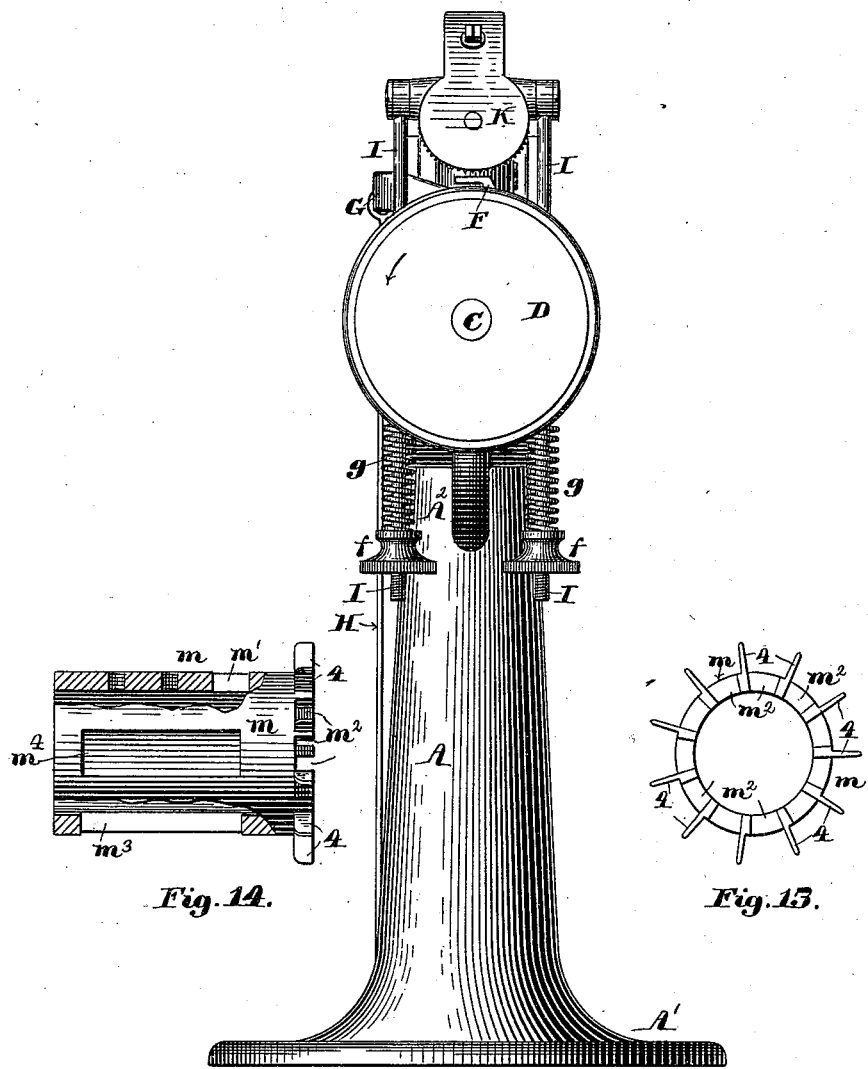
Figure 3:
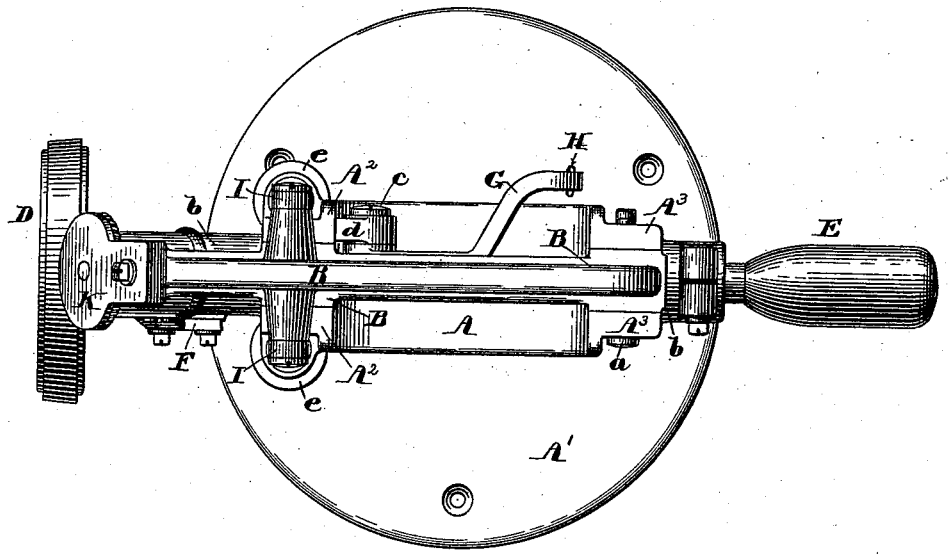
Figure 6:
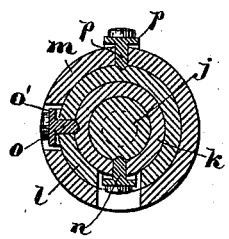
Figure 4:
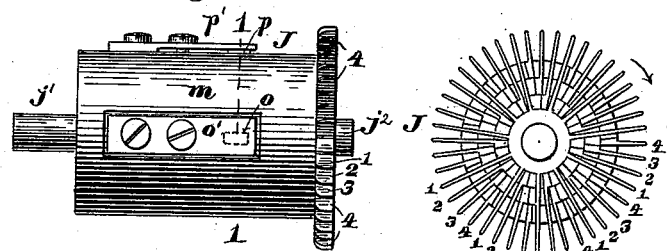
Figure 5:
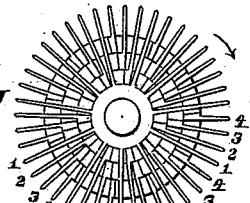
Figure 10:
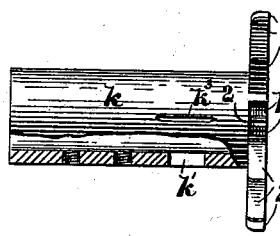
Figure 8:
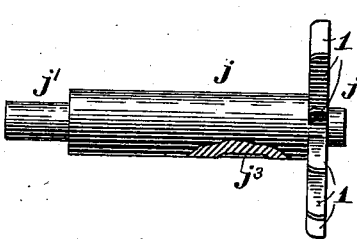
Figure 7:
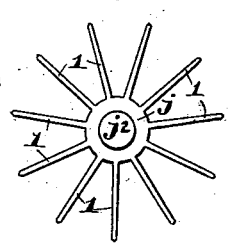
Figure 9:
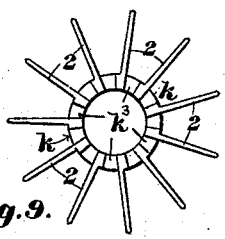
Figure 12:
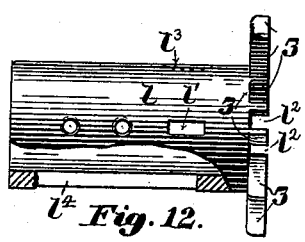
Figure 11:
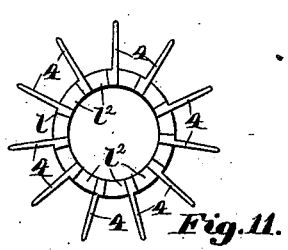

Figure 1 of the drawings is a front elevation of a machine embodying my invention. Fig. 2 is an elevation of the same looking toward the right of Fig. 1. Fig. 3 is a plan of the same. Fig. 4 is a side elevation of the separating-wheel removed from the machine. Fig. 5 is an end view of the same. Fig. 6 is a transverse section on line 1 1 on Fig. 4. Fig. 7 is an end elevation of the central spindle and its radiating arms, which serve as separating and indenting tools. Fig. 8 is a side elevation of the same with a small portion cut in section to show the detent-groove formed therein. Fig. 9 is an end view of a sleeve fitted to said spindle and carrying a second series of radiating separating-tools. Fig. 10 is a sectional side elevation of the same. Fig. 11 is an end view of a second sleeve and set of radiating separating-tools. Fig. 12 is a sectional side elevation of the same. Fig. 13 is an end view of the third or outer sleeve and its set of radiating separating arms or tools, and Fig. 14 is a sectional side elevation of the same.

In the drawings, A is a column having the broad base-flange A' and the upwardly-projecting arms $A^2$ and $A^3$, both of which are forked at their upper ends to receive the wheel-carrying stock B, pivoted at $a$ to the arm $A^3$, as shown. The arms $A^2$ and $A^3$ have formed therein below their forked portions suitable bearings $b$ $b$, in which is mounted so as to be revoluble therein the shaft C, carrying on its front end the work-supporting wheel D, and at its opposite end has secured thereto a medium of applying power thereto, which may be a crank E, for operating it by hand, as shown, or a spur gear-wheel acted upon by a train of gearing to drive said shaft by power at the desired speed. An edge gage F is adjustably secured to the bearing $b$ by the bolts $b'$ $b'$, which pass through slotted holes $b^2$ in said gage and screw into the bearing $b$ and projects upward therefrom in an oblique direction to a point slightly above and over the inner top edge of the work-supporting wheel D.

The stock or arm B is provided with the downwardly-projecting lug B', which is fitted to the fork in the upper end of the arm $A^2$, so as to guide said arm in its upward and downward movement, said lug resting at its lower end upon the end of the short arm of the lever G, pivoted at $c$ to the ear $d$, formed upon and projecting toward the right from the arm $A^2$, as shown in Figs. 1 and 3.

The end of the long arm of the lever G has connected thereto one end of the link or connecting-rod H, the opposite end of which is connected to a treadle (not shown) mounted upon a suitable pivot near the floor, by depressing which the movable end of the arm B may be raised to lift the tool-carrying wheel from the work when desired.

I I are two pendent rods, pivoted at their upper ends to the arm B and extending downward through ears $e$ $e$, formed on opposite sides of the arm $A^2$ and provided at their lower ends with the thumb-nuts $f f$, between which and said ears $e$ $e$ said rods are surrounded by the coiled springs $g$ $g$, the tension of which tends to draw the movable end of said arm B downward, which downward movement is limited by the collars $h$ $h$, adjustably secured upon said rods by the set-screws $i$ $i$.

A portion of the front end of the arm B is inclined upward at an angle of about thirty degrees, more or less, and is provided at the rear of said inclined portion with an arm or ear $B^2$, projecting downward therefrom at right angles to the under side of said upwardly-inclined portion, and has formed therein a bearing for the inner journal of the tool-carrying wheel J.

A guard plate or shield K is firmly secured to the movable end of the arm B and extends downward therefrom parallel to the ear $B^2$, and has formed therein a bearing for the outer journal of the tool-carrying wheel J and has its lower portion made curved to a circle, the radius of which corresponds nearly to the lengths of the separating and indenting tools from the axis of said wheel, and is beveled on its outer face around said circular portion nearly to a knife-edge, as shown.

The stitch-separating and indenting wheel J is made up of the shaft $j$, provided with the journals $j'$ and $j^2$ and a series of radial arms 1, formed in one piece therewith or firmly secured thereto, the sleeve $k$, provided at one end with a series of radiating arms 2, formed thereon or secured thereto, and with a series of notches $k^2$ between said arms to receive the arms 1 of the shaft $j$, the sleeve $l$, provided at one end with a series of radiating arms 3, formed thereon or secured thereto, and notches $l^2$ between said arms to receive the arms 2 of the sleeve $k$, and the sleeve $m$, having the radiating arms 4 formed upon or secured to one end thereof and provided with the notches $m^2$ to receive the arms 1, 2, and 3 of the shaft $j$ and the sleeves $k$ and $l$, respectively. The shaft $j$ has formed in its outer surface a short V-shaped groove $j^3$ extending longitudinally thereof, as shown in Figs. 6 and 8, with which the V-shaped end of the spring-pressed detent $n$, secured upon the periphery of the sleeve $k$ and projecting through the slot $k'$, formed in said sleeve, engages to hold said sleeve in its normal position. The sleeve $k$ has a similar V-shaped groove $k^3$ formed in its periphery, with which the V-shaped inner end of the detent $o$, carried by the spring $o'$, secured to the peripheral surface of the sleeve $l$ and projecting through the slot $l'$, formed in said sleeve $l$, engages. The sleeve $l$ has a similar V-shaped groove $l^3$ formed in its peripheral surface, indicated by dotted line in Fig. 12, with which the V-shaped inner end of the detent $p$, carried by the spring $p'$, secured upon the periphery of the sleeve $m$ and projecting through the slot $m'$, as shown, engages. The sleeve $l$ has cut through its wall the long slot $l^4$ to enable the spring-detent $n$ to be secured upon the sleeve $k$ after the sleeve $l$ is placed over the sleeve $k$, and the sleeve $m$ has cut through its wall two long slots $m^3$ and $m^4$ to enable the spring-detents $n$ and $o$ to be secured to the sleeves $k$ and $l$, respectively, when the several sleeves have been assembled one upon the other, as shown in Figs. 4, 5, and 6.

The operation of my invention is as follows: The several parts of the machine being in the positions shown in the drawings, the operator first places his foot upon the treadle and depresses it, thereby raising the movable end of the arm B and the tool-carrying wheel J against the tensions of the springs $g\ g$ a sufficient distance to permit the insertion of the sole-edge between the points of the separator-tools and the work-support D. The operator now takes a shoe in his left hand, with the toe toward him, and inserts the sole-edge at the forward end of the shank, beneath the separator-points and against the gage, which has previously been adjusted to position to bring the line of stitching just beneath the points of the separator, with a space between two stitches in a position to be entered by the separator-point No. 1 at the bottom of Fig. 5. The arm B is then released by the removal of the foot from the treadle and descends, causing the separator-points to enter the spaces between the stitches and indent, or partially indent, the welt, which is done by the tension of the springs $g\ g$, which have previously been adjusted to the required tension. The next movement is to turn the crank E so as to revolve the work-support D in the direction indicated by the arrow on Fig. 2 and feed the shoe, said work-support having its periphery serrated, roughened, or covered with rubber or other suitable material to cause an adhesion thereto sufficient to impart a positive movement to the shoe and by the engagement of the shoulders of the stitches on the sole cause the separator-wheel J to revolve in unison with the work-supporting feed-wheel D substantially as a gear-wheel is moved by a rack, except that as said wheel is made up of several parts, fitted one within the other, and movable upon one another about a common axis to a limited extent, each of said parts carrying an equal number of separating arms or points, and said several parts being held in their normal positions relative to each other by spring-pressed V-shaped detents, said separator-points will accommodate themselves to varying lengths of stitches, said points being accelerated or retarded by coming in contact with the variable lengths and oval forms of said stitches, which movement may be described as follows: As shown in Fig. 5 of the drawings, the separator-point No. 1 at the center of the lower half of said figure is vertical, and when forced downward by the tension of the springs $g\ g$ will be in its lowermost position in the work and have separated the two stitches on either side thereof and indented the welt. The separator-points No. 2 at the right and No. 4 at the left of said No. 1 are also in the work, and No. 3 to the left is just leaving the work and No. 3 to the right is just entering the work, and as the wheel revolves in the direction indicated by the arrow on Fig. 5 we will suppose that the stitch between Nos. 1 and 2 is shorter than the standard for which the divisions of the wheel call for, in which case, as the wheel revolves and the work is fed along, the separator No. 2 at the right of No. 1 will be forced by the shoulder of the stitch between Nos. 2 and 3 into the space in the rear or next to the right of that occupied by No. 1 by the yielding of the spring-detent $n$ connecting the sleeve $k$ with the spindle or shaft $j$, and the separators 2, 3, and 4 at the right of No. 1 will have advanced toward No. 1 a distance equal to the difference between the length of said shorter stitch and the length of the standard stitch and No. 2 will have assumed the perpendicular position occupied by No. 1 at the start and will have indented the welt, and No. 4 at the right will have commenced to enter the work, No. 3 at the left will have been released in full, and No. 4 at the left will be just leaving. The next stitch to be operated upon is between the separator-points Nos. 2 and 3 at the right, which we will suppose is of somewhat greater length than the standard, in which case the separator-point No. 3 will, as the wheel is revolved and the work is fed, bear upon the rear rounded shoulder of said stitch and be forced to the right till engaged by the forward shoulder of the next stitch to the rear and into the space next to the right of that occupied by the separator No. 2, and when said separator No. 3 has advanced to the position occupied at the start by No. 1 and has indented the welt the separator-point No. 4 at the right will be just entering the work and No. 4 at the left will have left the work and No. 1 at the center will be just leaving the work. The next stitch to be acted upon is that between the separator-points Nos. 3 and 4, which may be a stitch of standard length, in which case separator No. 4 will advance and occupy the space in the rear of that occupied by No. 3 and Nos. 3 and 4 will move along in their regular way, during which time Nos. 1 and 2 will have left the work and assumed their normal positions and separator No. 4 is at its lowest point beneath the center of the wheel and will have indented the welt. The next stitch to be acted upon is the one between Nos. 4 and 1 at the right, which, in case it be a short stitch, No. 1 will be forced toward No. 4 on entering the space between the stitches, or if it is a long stitch said separator No. 1 will be forced away from No. 4, and so on, these operations being repeated between each set of separators Nos. 1, 2, 3, and 4 throughout the entire revolution of the wheel, the separator-points moving toward each other in the case of short stitches, away from each other in the case of long stitches, and maintaining their normal relative positions when the stitches are of the standard length, as the case may be, the springs being adjusted to the right tension to yield in their order and allow any two teeth to accelerate or retard one from the other by moving in either direction with their respective sleeves or shaft against the tension of the connecting spring-detents.

This machine is not designed for such excessive variations as those in my before-cited Letters Patent, but are limited in the variations to that to which it is adapted, but the machine would be provided with a plurality of wheels adapted to different standard lengths of stitches, and also provided with different shapes and widths of separators to accommodate different styles of work.

One great advantage of this machine is the rapidity with which the work can be accomplished.

What I claim as new, and desire to secure by Letters Patent of the United States, is—

1. In a stitch separating and indenting machine, the combination of a work-support; a separating wheel provided with a plurality of automatically adjustable separating tools; and means for successively forcing said tools between the stitches to separate them.

2. In a stitch separating and indenting machine, the combination of a work support; an automatically adjustable separating wheel; a series of automatically adjustable separating tools carried by said wheel; means for forcing said tools between the stitches; and means for revolving the work support to feed the work.

3. In a stitch separating and indenting machine, the combination of a revoluble work-support, to sustain and feed the work; an automatically adjustable separating wheel; a series of yielding separating tools carried by said wheel and adapted to be moved toward or from each to accommodate themselves to the spaces between the stitches whether of uniform or varying lengths by contact with the shoulders of said stitches.

4. In a stitch separating and indenting machine, the combination of a revoluble work support provided with a frictional peripheral surface; a revoluble separating wheel; a series of automatically adjustable separating tools carried by said wheel; means for forcing said tools successively between the stitches; and means for regulating the depth to which said tools shall enter the work.

5. In a stitch separating and indenting machine, a separating wheel composed of a plurality of sections fitted one within or upon another and revoluble together about a common axis, and each movable independently about said axis to a limited extent, and each provided with a plurality of radiating separating arms or tools arranged to occupy the same plane at right angles to their axis of revolution, and the tools of the different sections succeeding each other in regular order, in as many divisions of the circumference of the wheel as there are sections of said wheel.

6. In a stitch separating and indenting machine the separating wheel J composed of the shaft $j$ provided with a series of radiating arms 1, 1, and a plurality of sleeves as $k$ $l$ and $m$ each provided with a series of radiating arms 2, 3 and 4 respectively, said sleeves being fitted one within another, and upon the shaft $j$, with their several radiating arms in the same transverse plane, said shaft and sleeve being connected together by spring detents, whereby said shaft and sleeves may revolve in unison or each may be accelerated or retarded when pressure is applied to the points of its radiating arms.

7. In a stitch separating and indenting wheel the combination of the shaft $j$ provided with a journal at each end with the series of radiating arms 1, 1, and with the V shaped longitudinal groove $j^3$; the sleeve $k$ provided with the series of radiating arms 2, 2, at one end, with the series of notches $k^2$ between said arms, with the slot $k'$ and with the V shaped longitudinal groove $k^3$; the spring detent $n$ secured to said sleeve $k$ and engaging the groove $j^3$ in the shaft $j$; the sleeve $l$ provided with the series of radiating arms 3, 3 at one end, the series of notches $l^2$ between said arms, with the slots $l'$ and $l^4$ and the V shaped groove $l^3$; the sleeve $m$ provided with the series of radiating arms 4, 4, at one end, with the notches $m^2$ between said arms 4, 4, and with the slots $m'$ $m^3$ and $m^4$; the spring detent $o$ secured to the sleeve $l$ and engaging the V shaped groove in the sleeve $k$; and the spring detent $p$ secured to the sleeve $m$ and engaging the V shaped groove $l^3$ in the sleeve $l$, all constructed arranged and operating as set forth.

In testimony whereof I have signed my name to this specification, in the presence of two subscribing witnesses, on this 3d day of June, A. D. 1895.

JOHN B. HADAWAY.

Witnesses:
N. C. LOMBARD,
H. THEODORE FLETCHER.